United States Patent [19]

Hosoi et al.

[11] Patent Number: 4,864,134
[45] Date of Patent: Sep. 5, 1989

[54] IMAGE READ-OUT APPARATUS

[75] Inventors: Yuichi Hosoi; Satoshi Arakawa; Hideo Ishizaka; Terumi Matsuda; Kenji Takahashi, all of Kaisei, Japan

[73] Assignee: Fuji Photo Film Co., Ltd., Kanagawa, Japan

[21] Appl. No.: 141,259

[22] Filed: Jan. 6, 1988

Related U.S. Application Data

[63] Continuation-in-part of Ser. No. 884,628, Jul. 11, 1986, abandoned.

[30] Foreign Application Priority Data

| Jul. 16, 1985 | [JP] | Japan | 60-156255 |
| Jul. 16, 1985 | [JP] | Japan | 60-156256 |
| Jul. 16, 1985 | [JP] | Japan | 60-156257 |
| Jul. 16, 1985 | [JP] | Japan | 60-156258 |
| Dec. 28, 1985 | [JP] | Japan | 60-298605 |

[51] Int. Cl.$^4$ ............................. G01N 23/04
[52] U.S. Cl. .................. 250/327.2; 250/207; 313/532
[58] Field of Search .......... 250/327.2, 484.1, 207, 250/228; 313/532, 535, 536

[56] References Cited

U.S. PATENT DOCUMENTS

| 3,413,479 | 11/1968 | Hendee | 250/207 |
| 4,302,671 | 11/1981 | Kato et al. | 250/337 |
| 4,346,295 | 8/1982 | Tanaka et al. | 250/337 |
| 4,527,060 | 7/1985 | Suzuki et al. | 250/484.1 B |
| 4,568,984 | 2/1986 | Juergensen et al. | 356/239 |
| 4,591,714 | 5/1986 | Goto et al. | 250/494.1 B |
| 4,616,129 | 10/1986 | Yamada et al. | 250/327.2 F |
| 4,629,890 | 12/1986 | Goto et al. | 250/484.1 B |

Primary Examiner—Carolyn E. Fields
Attorney, Agent, or Firm—Gerald J. Ferguson, Jr.

[57] ABSTRACT

An image read-out apparatus includes a main scanning device for scanning a sheet carrying an image recorded thereon with a light beam in a main scanning direction and obtaining light carrying the image information from the sheet, a sub-scanning device for moving the sheet with respect to the light beam in a sub-scanning direction approximately normal to the main scanning direction, and a light detector for detecting the light obtained from the sheet. The light detector comprises a long photomultipler having a light receiving face extending along the main scanning line and positioned close to the sheet.

32 Claims, 13 Drawing Sheets

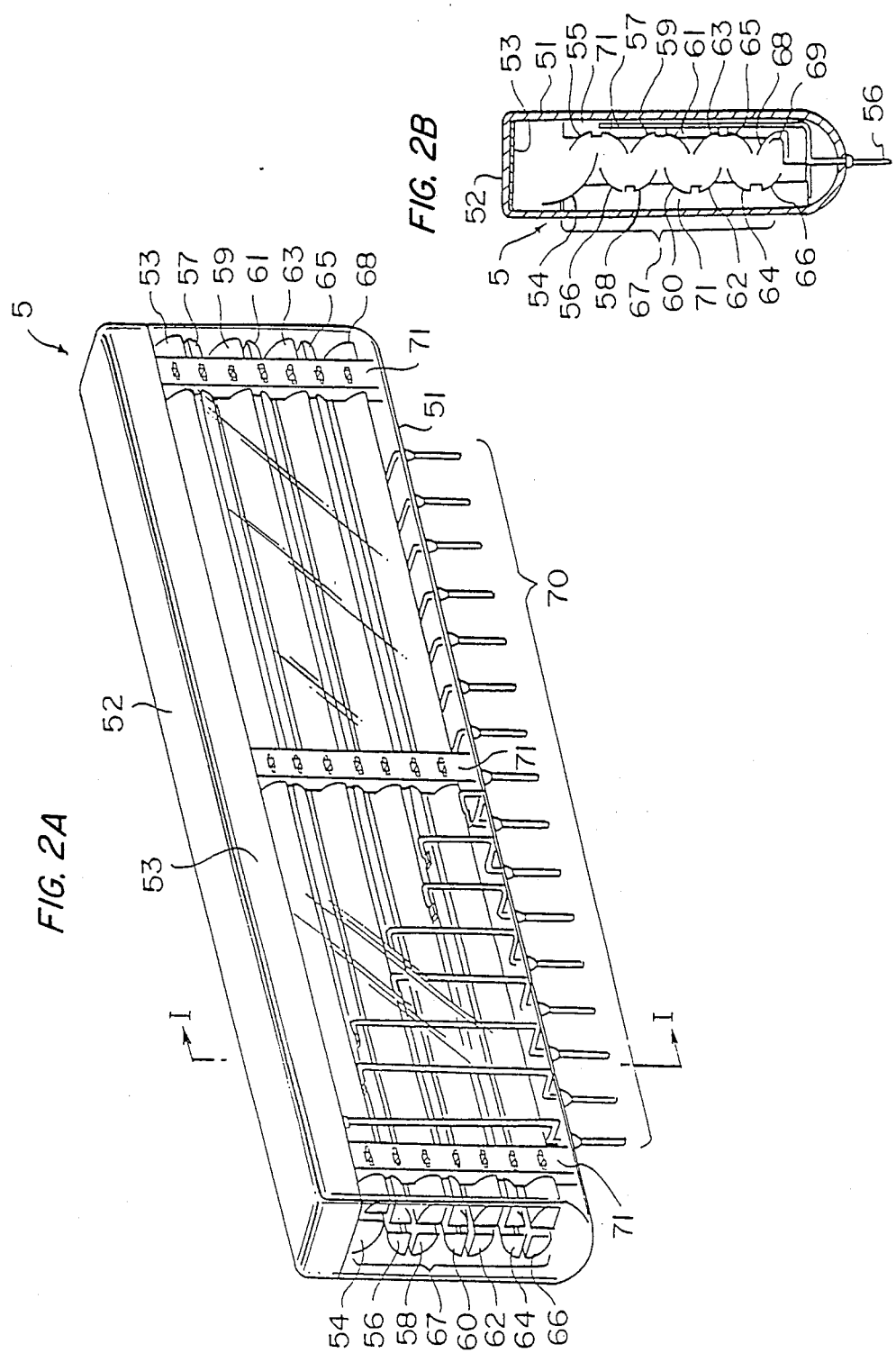

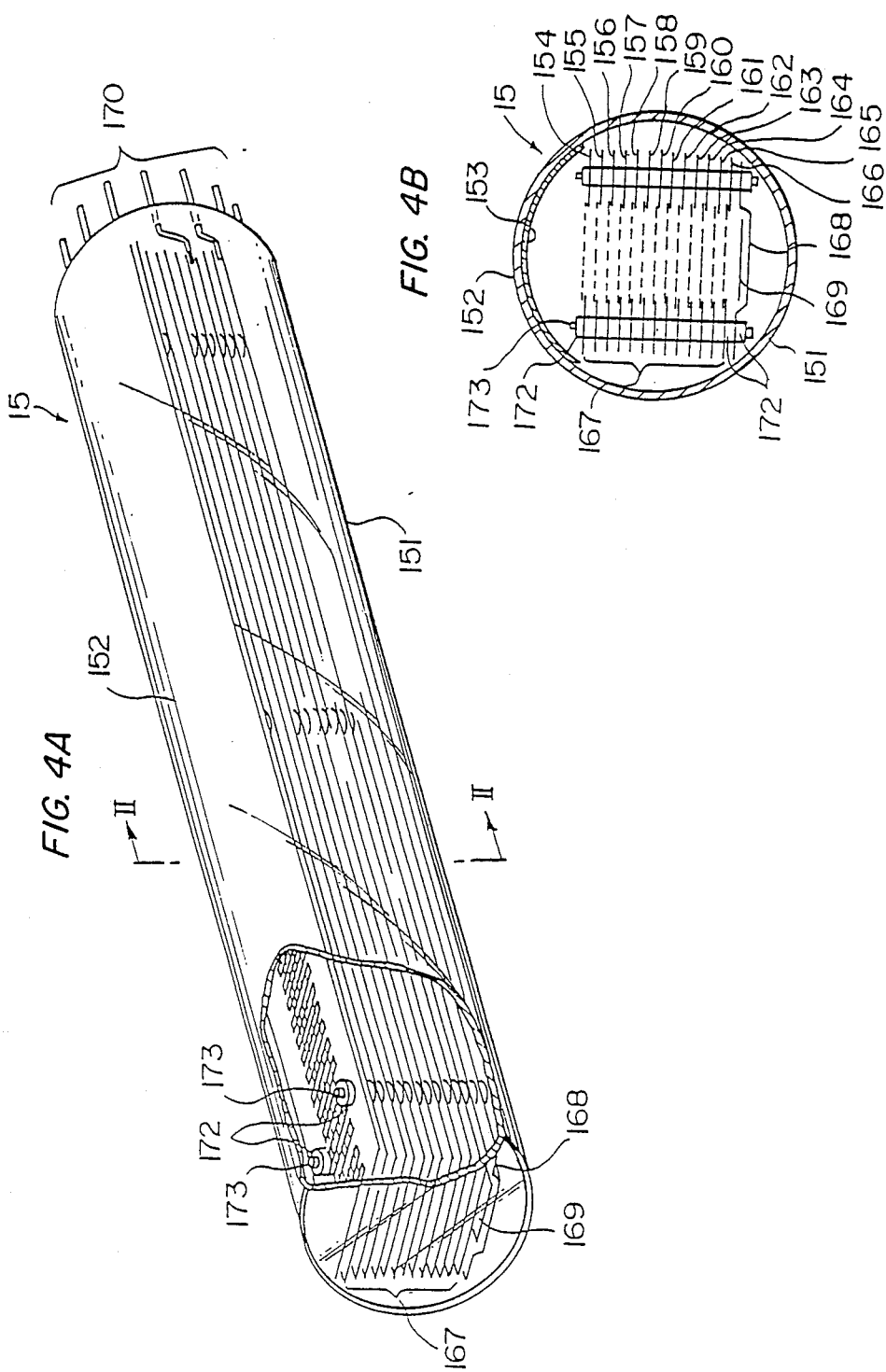

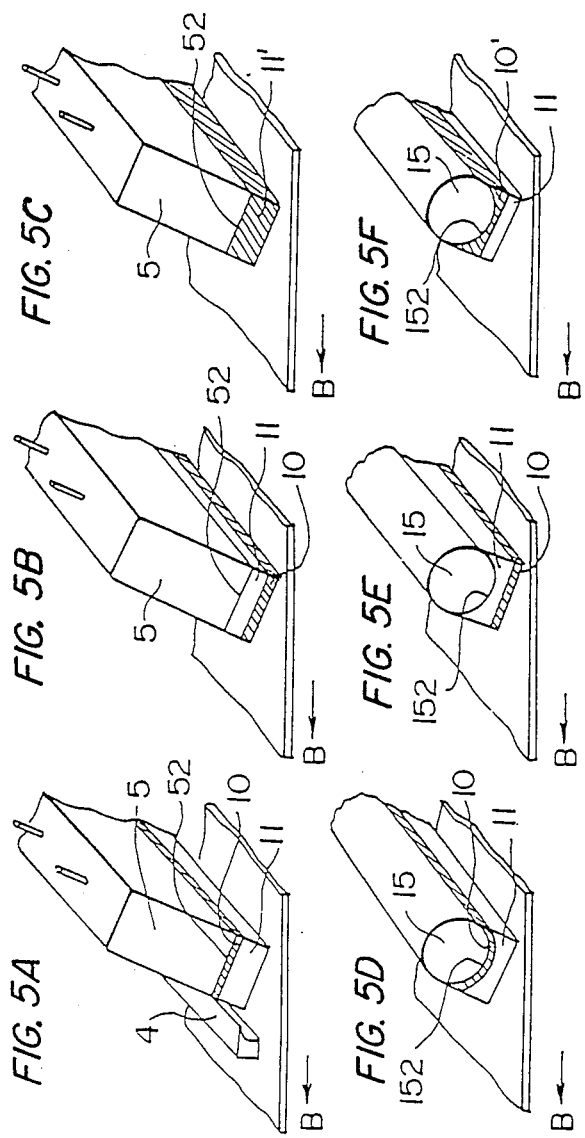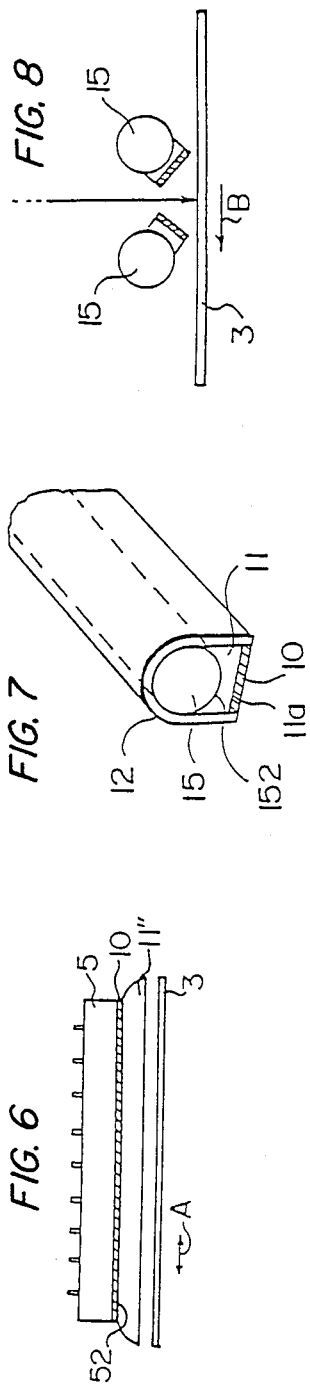

IMAGE READ-OUT APPARATUS

This application is a continuation-in-part application of application Ser. No. 884,628 filed July 11, 1986, now abandoned.

BACKGROUND OF THE INVENTION

1. Field of the Invention

This invention relates to an image read-out apparatus for reading out an image such as a radiation image. This invention particularly relates to an improvement in a light detection means of the image read-out apparatus.

2. Description of the Prior Art

There have heretofore been widely used image read-out apparatuses wherein an image recorded on a sheet is read out by two-dimensionally scanning the sheet with a light beam such as a laser beam, and detecting light carrying the image information obtained by exposure of the sheet to the light beam, such as light reflected by the sheet, light transmitting through the sheet, or light emitted by the sheet, by use of a light detection means provided with a photomultiplier or the like.

The image read-out apparatus of this type is used, for example, as a scanner for plate making, an input apparatus for a computer or a facsimile, and a radiation image read-out apparatus in a radiation image recording and reproducing system using a stimulable phosphor sheet as disclosed, for example, in U.S. Pat. Nos. 4,258,264 and 4,346,295, and Japanese Unexamined Patent Publication No. 56(1981)-11395.

Specifically, when certain kinds of phosphors are exposed to a radiation such as X-rays, $\alpha$-rays, $\beta$-rays, $\gamma$-rays, cathode rays or ultraviolet rays, they store a part of the energy of the radiation. Then when the phosphor which has been exposed to the radiation is exposed to stimulating rays such as visible light, light is emitted by the phosphor in proportion to the stored energy of the radiation. A phosphor exhibiting such properties is referred to as a stimulable phosphor. In the aforesaid radiation image read-out apparatus, a radiation image of an object such as the human body is stored on a sheet provided with the stimulable phosphor, the stimulable phosphor sheet carrying the radiation image is then scanned with stimulating rays such as a laser beam which cause the sheet to emit light in proportion to the stored energy of the radiation, and the emitted light is photoelectrically detected to obtain an image signal.

FIG. 25 shows an example of the aforesaid radiation image read-out apparatus, the mechanism of which will be described below.

Stimulating rays 101a of a predetermined intensity are emitted by a stimulating ray source 101 to a galvanometer mirror 102. The stimulating rays 101a are deflected by the galvanometer mirror 102 and made to impinge upon a stimulable phosphor sheet 103 positioned below the galvanometer mirror 102 so that the sheet 103 is scanned by the stimulating rays 101a in the main scanning direction, i.e. in the width direction of the sheet 103 as indicated by the arrow A. While the stimulating rays 101a are impinging upon the stimulable phosphor sheet 103, the sheet 103 is conveyed in the sub-scanning direction as indicated by the arrow B, for example, by an endless belt device 109. Therefore, scanning in the main scanning direction is repeated at an angle approximately normal to the sub-scanning direction, and the whole surface of the stimulable phosphor sheet 103 is two-dimensionally scanned by the stimulating rays 101a. As the stimulable phosphor sheet 103 is scanned by the stimulating rays 101a, the portion of the sheet 103 exposed to the stimulating rays 101a emits light having an intensity proportional to the stored radiation energy. The light emitted by the stimulable phosphor sheet 103 enters a transparent light guide member 104 from its light input face 104a positioned close to the sheet 103 in parallel to the main scanning line. The light guide member 104 has a flat-shaped front end portion 104b positioned close to the stimulable phosphor sheet 103 and is shaped gradually into a cylindrical shape towards the rear to form an approximately cylindrical rear end portion 104c which is closely contacted with a photomultiplier 105. The light emitted by the stimulable phosphor sheet 103 upon stimulation thereof and entering the light guide member 104 from its light input face 104a is guided inside of the light guide member 104 and up to the rear end portion 104c, and received by the photomultiplier 105 via a filter (not shown) for selectively transmitting the light emitted by the stimulable phosphor sheet 103. Thus the light emitted by the stimulable phosphor sheet 103 in proportion to the radiation energy stored thereon is detected and converted into an electric image signal by the photomultiplier 105. The electric image signal thus obtained is sent to an image processing circuit 106 and processed therein. The electric image signal thus processed is then reproduced into a visible image and displayed, for example, on a cathode ray tube (CRT) 107, or stored on a magnetic tape 108, or directly reproduced as a hard copy on a photographic film or the like.

In the aforesaid radiation image read-out apparatus, the light detection means used for detecting the light emitted by the stimulable phosphor sheet 103 comprises the photomultiplier 105 and the light guide ember 104. However, the light guide member 104 used in the conventional apparatus is fabricated to guide the light entering from the light input face 104a positioned along the main scanning line through total reflection to the photomultiplier 105 which has a small width in the main scanning direction. Therefore, the light guide member 104 becomes large, and consequently the whole read-out apparatus provided with the light guide member 104 becomes large. Further, the light guide member 104 has the drawback that a part of the light guided through total reflection inside of the large light guide member 104 is not totally reflected because of angle-related factors and passes through the light guide member 104, and therefore the light guide efficiency becomes low. Also, the light guide member 104 is fabricated of a light guide sheet member such as an acrylic plate by forming one end which corresponds to the light input face into a linear shape and the other end which corresponds to the light output face into a shape (for example, a cylindrical shape) which matches the light receiving face of the photomultiplier 105. Therefore, the fabricating process becomes complicated, and the manufacturing cost becomes high. As a result, the manufacturing cost of the radiation image read-out apparatus becomes high.

SUMMARY OF THE INVENTION

The primary object of the present invention is to provide an image read-out apparatus wherein light emitted by a sheet is detected without using a large light guide member having a complicated shape.

Another object of the present invention is to provide an image read-out apparatus which is small and improves the light guide efficiency and which is fabricated at below manufacturing cost.

The present invention provides an image read-out apparatus including a main scanning means for scanning a sheet carrying an image recorded thereon with a light beam in a main scanning direction and obtaining light carrying the image information from the sheet, a sub-scanning means for moving the sheet with respect to the light beam in a sub-scanning direction approximately normal to the main scanning direction, and a light detection means for detecting the light obtained from the sheet, wherein said light detection means comprises a long photomultiplier having a light receiving face extending along the main scanning line and positioned close to said sheet.

In the present invention, since the long photomultiplier is positioned close to the stimulable phosphor sheet, it is possible to receive the light obtained by the sheet such as the light emitted by the stimulable phosphor sheet by the light receiving face of the photomultiplier without using the conventional large light guide member which has a complicated shape. By "long photomultiplier" is meant a photomultiplier having the light receiving face positioned along the main scanning line and having such a shape that the light obtained at the scanning position is detected at every position in the main scanning direction. Though the length of the light receiving face of the long photomultiplier should preferably be equal to or longer than the read-out scanning width on the sheet, it may be slightly shorter than the read-out scanning width. Particularly, in the case where a thin light guide member is positioned at the light receiving face of the photomultiplier as will be described later, it is possible to detect light efficiently by appropriately defining the shape of the thin light guide member even though the length of the light receiving face of the photomultiplier is somewhat shorter than the read-out scanning width on the sheet. The term "positioning a photomultiplier close to a sheet" embraces not only the case where the photomultiplier is positioned near the sheet so that light obtained at the scanning position directly and efficiently enters the light receiving face, but also the case where the photomultiplier is spaced from the sheet by the thickness of a filter and/or a thin light guide member so that the filter and/or the thin light guide member may be positioned on the light receiving face of the photomultiplier.

In the image read-out apparatus of the present invention, since light obtained by the sheet is detected by the long photomultiplier positioned close to the sheet without using the conventional large light guide member having a complicated shape, it is possible to make the whole apparatus small, to decrease the manufacturing cost, and to improve the efficiency with which the light obtained by the sheet is guided. Further, in the case where an optical reflection element or an integrating cylinder is used as will be described later, it becomes possible to further improve the light guiding efficiency.

As understood from the specification, it should be noted that "moving a sheet with respect to a light beam in a sub-scanning direction" means movement of the sheet relative to the light beam and includes both the movement of the sheet with the light beam standing still in the sub-scanning direction and the movement of the light beam in the sub-scanning direction with the sheet standing still.

BRIEF DESCRIPTION OF THE DRAWINGS

FIG. 2A is a perspective view showing the long box type photomultiplier used in the image read-out apparatus of the present invention, FIG. 2B is a sectional view taken along line I—I of FIG. 2A, FIG. 4A is a perspective view showing the long Venetian blind type photomultiplier used in the image read-out apparatus of the present invention, FIG. 4B is a sectional view taking along line II—II of FIG. 4A, FIGS. 5A to 5J and 6 are schematic views showing the photomultipliers provided with a filter and a thin light guide member on the light receiving face, FIG. 7 is a perspective view showing the photomultiplier housed in a light shielding case, FIG. 8 is a schematic view showing another embodiment of the image read-out apparatus in accordance with the present invention wherein two photomultipliers are used.

DESCRIPTION OF THE PREFERRED EMBODIMENTS

The present invention will hereinbelow be described in further detail with reference to the accompanying drawings.

Figure 1:
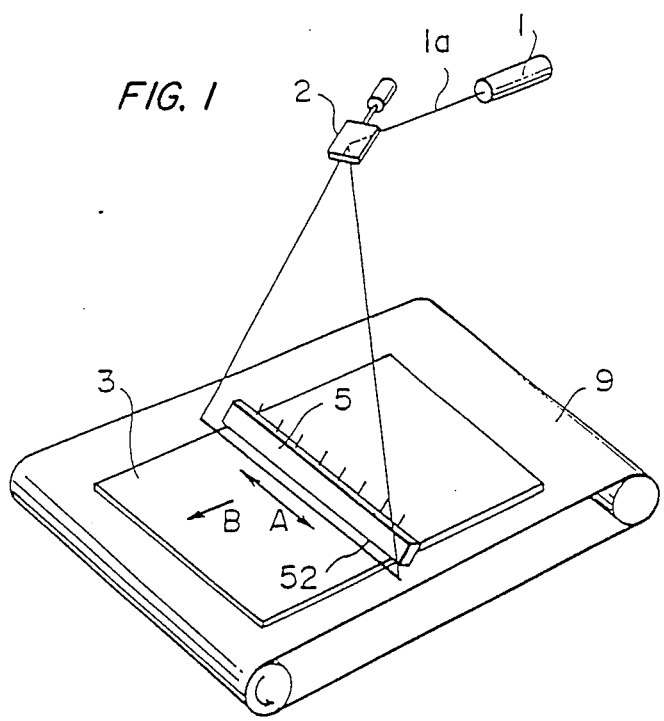
FIG. 1 is a perspective view showing an embodiment of the image read-out apparatus in accordance with the present invention, which is fabricated for reading out a radiation image.

Referring to FIG. 1, stimulating rays 1a emitted by a stimulating ray source 1 to a galvanometer mirror 2 are reflected and deflected thereby to impinge upon a stimulable phosphor sheet 3 conveyed by an endless belt device 9 in the direction as indicated by the arrow B so as to scan the sheet in the main scanning direction as indicated by the arrow A. As the stimulable phosphor sheet 3 carrying a radiation image stored thereon is exposed to the stimulating rays 1a, the exposed portion of the sheet 3 emits light in proportion to the stored radiation energy. In the apparatus of the present invention, a long photomultiplier 5 is positioned close to the stimulable phosphor sheet 3 as a light detection means for detecting the light emitted by the exposed portion of the sheet 3.

The photomultiplier 5 has a light receiving face 52 positioned along the main scanning line on the stimulable phosphor sheet 3. The length of the light receiving face 52 should preferably be equal to or longer than the read-out scanning width on the stimulable phosphor sheet 3 so that the light receiving face 52 may efficiently receive the light emitted by every portion of the sheet 3 in the main scanning direction. The light entering the photomultiplier 5 is converted thereby into an electric signal, which is sent to an image processing circuit (not shown), processed thereby and used to reproduce a visible image on a CRT or stored on a magnetic tape.

In general, conventional photomultipliers are classified into several types according to the electrode configuration at a multiplying section inside of the photomultiplier for multiplying minute photocurrents to an appropriate level. The long photomultiplier in the present invention may be obtained by extending the conventional photomultipliers in the direction normal to their side faces. The photomultiplier 5 used in the present invention as shown in FIGS. 2A and 2B has an electrode configuration generally called the box type. The photomultiplier 5 comprises a vacuum body 51 fabricated of glass or the like, a photocathode (photoelectric face) 53 positioned to face the long light receiving face 52 for emitting photoelectrons in the vacuum body 51, and a multiplying section 67 positioned under the photocathode 53 in the vacuum body 51 and including a plurality (13 in this embodiment) of electrodes or dynodes through 66 having a quarter cylinder shape and exhibiting the secondary electron emission effect. A shield electrode 68 is positioned to face a lowermost dynode 66 of the multiplying section 67, and an anode 69 for collecting the electron streams multiplied by the multiplying section 67 and generating a signal is positioned inside of the shield electrode 68. These electrodes are respectively connected electrically in a one-to-one relation with terminals of a terminal group 70 positioned on the side opposite to the light receiving face 52 in a number equal to the number of the electrodes. The dynodes 54 through 66 and the shield electrode 68 are secured inside of the body 51 by supporting members 71, 71, 71 fabricated of an insulating material. The shield electrode 68 need not necessarily provided.

Figure 3:
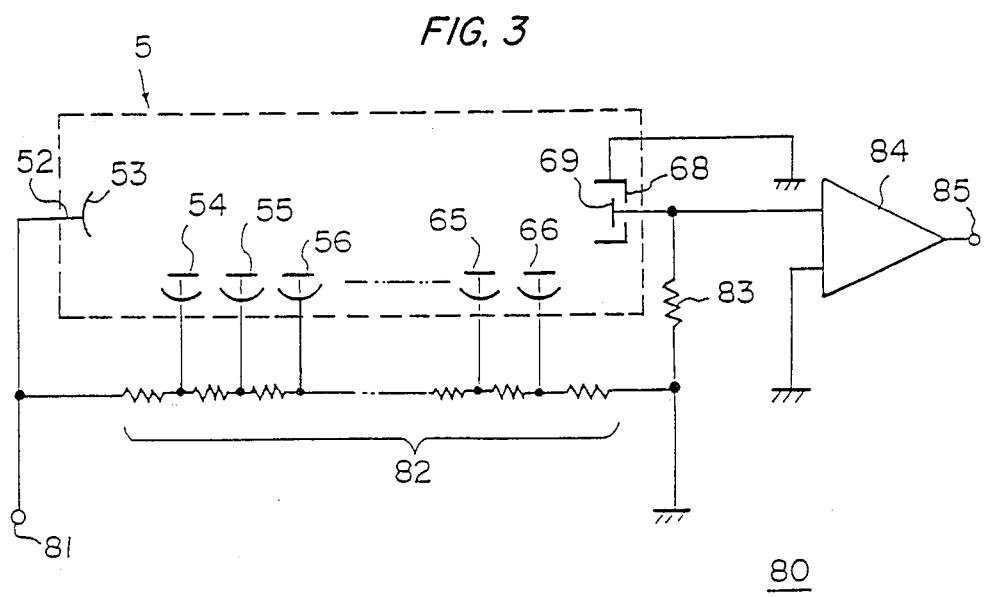
FIG. 3 is a circuit diagram showing the drive circuit for the photomultiplier of FIG. 2A.

FIG. 3 shows an electric circuit 80 for driving the photomultiplier 5 and obtaining a photoelectric output. In FIG. 3, similar elements are numbered with the same reference numerals with respect to FIG. 2A. A high negative voltage is applied to the photocathode 53 via a high negative voltage applying terminal 81. The high negative voltage applied to the high negative voltage applying terminal 81 is divided by a bleeder resistance group 82 into voltages which are applied respectively to the dynodes 54 through 66. The shield electrode 68 is grounded, and the anode 69 is grounded via a resistor 83 and is connected with one of the terminals of an amplifier 84. The other terminal of the amplifier 84 is grounded. The photoelectrically converted image information is obtained as an electric signal from an output terminal 85 of the amplifier 84.

FIGS. 4A and 4B show a different type of photomultiplier 15 used in the present invention, which has an electrode configuration generally called the Venetian blind type. The photomultiplier 15 comprises a cylindrical body 51, a photocathode 153 positioned along the inner surface of the body 151 to face a light receiving face 152, and a multiplying section 167 positioned under the photocathode 53 and including a plurality (13 in this embodiment) of plate-like dynodes 154 through 166 which are stacked via insulation members 172, 172 and secured by pins 173, 173. The dynodes 154 through 166 are respectively constituted by a conductive plate provided with a plurality of sections cut in a U-shape and bent to form a blind-like shape. A shield electrode 168 is secured by pins 173, 173 under the multiplying section 167 via an insulation member 172, and an anode 169 is positioned inside of the shield electrode 168. These electrodes are electrically connected with terminals of a terminal group 170 positioned at the side end of the body 151. For obtaining the photoelectric output, the circuit as shown in FIG. 3 may be used. Also in this case, the shield electrode 168 need not necessarily be provided. The long photomultiplier used in the present invention may also be fabricated by extending a photomultiplier provided with a multiplying section comprising other known electrode or electrodes.

In the aforesaid embodiments, since the long photomultiplier having the light receiving face positioned along the main scanning line is positioned close to the stimulable phosphor sheet, it becomes unnecessary to use the conventional large light guide member having a complicated shape and requiring a high manufacturing cost, so it becomes possible to make the whole apparatus small and to decrease the manufacturing cost. Further, since the light receiving face is positioned close to the scanning position on the stimulable phosphor sheet where the light is emitted in proportion to the stored radiation energy, and since almost all of the emitted light directly impinges upon the light receiving face, it is possible to improve the light guiding efficiency as compared with the case where the conventional large light guide member is used for guiding the light emitted by the stimulable phosphor sheet.

In the aforesaid radiation image read-out apparatus, it is necessary to efficiently guide the light emitted by the stimulable phosphor sheet in proportion to the stored radiation energy. Also, when the stimulating rays impinge upon the stimulable phosphor sheet, a part thereof may be reflected by the stimulable phosphor sheet, and a part of the reflected stimulating rays may impinge upon the light receiving face of the photomultiplier. Therefore, it is necessary for the photomultiplier to accurately detect only the light emitted by the stimulable phosphor sheet in proportion to the stored radiation energy and not to detect the reflected stimulating rays. For this purpose, the long photomultiplier in the radiation image read-out apparatus should preferably be provided on its light receiving face with a very thin light guide member and a filter for selectively transmitting only light having a wavelength within the wavelength range of the light emitted by the stimulable phosphor sheet. FIGS. 5A through 5J show examples of the photomultipliers provided with the thin light guide member and the filter on the light receiving face.

FIG. 5A shows the case where a filter 10 is provided on the flat light receiving face of the photomultiplier, for example, on the light receiving face 52 of the box type photomultiplier 5 as shown in FIG. 2, and a plate-like light guide member 11 fabricated of an acrylic plate or the like is provided on the filter 10. Since the light guide member 11 used in the present invention is very thin and has a simple shape, the problem of the conventional light guide member that the whole apparatus becomes large and expensive does not arise. The positions of the filter 10 and the light guide member 11 may be interchanged as shown in FIG. 5B. Also, as shown in FIG. 5C, a light guide member 11' provided on the light receiving face 52 may be provided with a filter action by coloring so that only light having a wavelength within the wavelength range of the light emitted by the stimulable phosphor sheet is transmitted and light having a wavelength within the wavelength range of stimulating rays is absorbed. FIGS. 5D, 5E and 5F show the cases where the filter 10 or a filter 10' and the light guide member 11 are provided on the curved light receiving face of the photomultiplier, for example, on the light receiving face 152 of the Venetian blind type photomultiplier 15 as shown in FIG. 3. In the case where the thickness of the filter 10' is different between various positions thereof, the density distribution of the whole filter 10' should be changed so that the density decreases towards the thicker sections and the filter characteristics become uniform. It is also possible to provide only either the filter or the light guide member on the light receiving face.

Figure 5G:
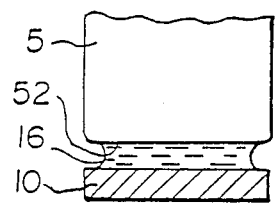
Figure 5H:
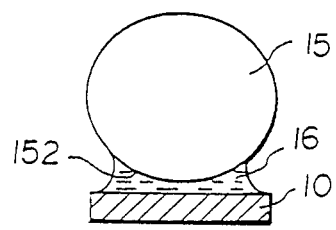
Figure 5I:
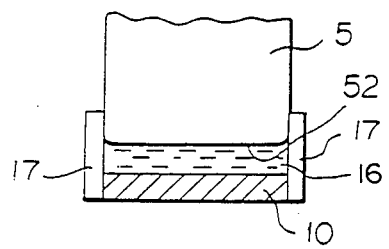
Figure 5J:
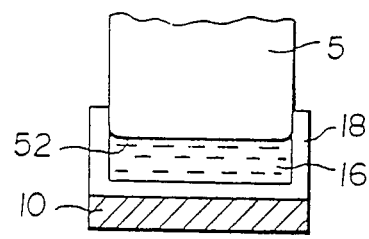

Also, as shown in FIGS. 5G through 5J, the light guide member may be constituted by a light guide liquid 16. When the light guide liquid 16 has a high affinity for the light receiving face 52 and the surface of the filter 10 and has a high agglomerating property, the filter surface may be secured to the light receiving face 52 by the light guide liquid 16. Further, as shown in FIG. 5I, in order to prevent evaporation or deterioration of the light guide liquid 16, protectors 17, 17 constituted by protective sheets, protective films, protective plates, or the like may respectively be provided on the side faces where the light guide liquid 16 is present. Or, as shown in FIG. 5J, the light guide liquid 16 may be filled in a vessel 18 having a transparent bottom on which the filter 10 is mounted, and the light receiving face 52 of the photomultiplier 5 may be positioned to face the filter 10 with the light receiving face 52 contacting the light guide liquid 16. In this case, the bottom of the vessel 18 may also act as the filter. It is also possible to secure the filter 10 partially to the light receiving face 52 of the photomultiplier 5 by use of an adhesive, and to charge the light guide liquid 16 into the space remaining between the filter 10 and the light receiving face 52. This configuration is advantageous particularly when the thermal expansion coefficients of the filter 10 and the light receiving face 52 are different and the filter 10 cannot be secured over its whole surface to the light receiving face 52. The light guide liquid 16 used for this purpose should preferably be non-volatile or low-volatile and have a high viscosity, and may be silicone oil, liquid paraffin, or the like. It is also possible to use an aqueous liquid such as water, or an aqueous solution.

In the modifications shown in FIGS. 5G through 5J, since light guiding between the filter and the light receiving face of the photomultiplier is effected by the light guide liquid, it is possible to eliminate light loss caused by low adhesion between the light receiving face and the light guide member or between the light guide member and the filter, or caused by reflection at the light receiving face of the photomultiplier or the filter surface. Further, since the light guide member is a liquid, it is possible to accomplish light guiding without being affected by the shapes of the light receiving face of the photomultiplier and the filter surface.

As shown in FIG. 6, when the length of the photomultiplier in the main scanning direction is shorter than the read-out scanning width on the stimulable phosphor sheet 3, a light guide member 11" may be extended longitudinally from the light receiving face 52 of the photomultiplier 5 towards the stimulable phosphor sheet 3 so that it efficiently guides the light emitted by the entire read-out scanning width on the sheet 3 to the light receiving face 52 of the photomultiplier 5.

However, when light enters the long photomultiplier from a section outside of the light receiving face or without passing through the filter, noise is caused in a reproduced image. Accordingly, as shown in FIG. 7, the photomultiplier 15 should be covered by a light shielding case 12 to prevent such light causing noise from entering the photomultiplier 15 and to conduct image read-out more accurately. In FIG. 7, the light guide member 11 is provided on the light receiving face 152, and the filter 10 is provided on a light input face 11a of the light guide member 11. In this case, the surface of the photomultiplier 15 outside of the light receiving face 152 and the surface of the light guide member 11 outside of its surface contacting the filter 10 may be covered by the light shielding case 12.

In general, the photomultiplier is readily affected by an external magnetic field, and the photocurrent multiplication factor markedly decreases by the adverse effect of the magnetic field. In the present invention, since the photomultiplier is long, it may be more vulnerable to the adverse effect of a magnetic field than in the conventional photomultiplier because of the configuration and the design of the whole apparatus. Accordingly, the light shielding case 12 should preferably be fabricated of Permalloy or the like so that it acts also as a magnetic shielding case.

Further, the number of photomultipliers used in the image red-out apparatus of the present invention is not limited to one. For example, as shown in FIG. 8, long photomultipliers 15, 15 may be positioned respectively on the upstream and downstream sides in the conveyance direction of the stimulable phosphor sheet 3 with the main scanning line intervening therebetween, and detection of the light emitted by the sheet 3 may be conducted by using the two photomultipliers simultaneously. In this case, it is possible to further improve the efficiency with which the light emitted by the stimulable phosphor sheet 3 is guided.

FIGS. 9A to 9D and FIG. 10 show further examples of the photomultipliers.

Figure 9A:
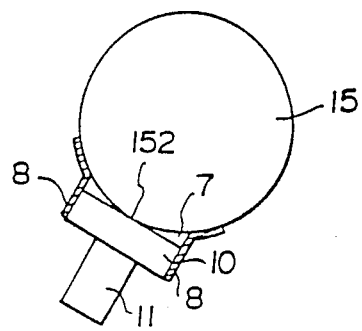
FIGS. 9A to 9D and FIG. 10 are schematic views showing further examples of the photomultipliers provided with an optical element.

In FIG. 9A, the filter 10 is adhered to the light receiving face 152 of the photomultiplier 15 via a light-permeable adhesive 7 which may be of the ultraviolet-curing type for example, and the light guide member 11 formed of glass, an acrylic resin or the like is disposed on the filter 10 integrally therewith. The filter 10 selectively transmits only light having a wavelength within the wavelength range of the light emitted by the stimulable phosphor sheet and cuts off the stimulating rays reflected by the stimulable phosphor sheet. The surface of the filter 10 adhered to the cylindrical light receiving face 152 of the photomultiplier 15 is flat. Therefore, the thickness of the adhesive 7 for adhering the filter 10 to the light receiving face 152 becomes comparatively large at both ends of the filter 10. Since the length of the light guide member 11 from its light input face to its light output face is very short and the shape thereof is simple, the aforesaid problems of the conventional light guide member do not arise.

The thickness of the adhesive 7 is large at the side faces that contact the ambient air, and the adhesive 7 is readily affected by ambient humidity. Therefore, in the example shown in FIG. 9A, moisture-proof materials 8, 8 are coated on the side faces of the adhesive 7 and the filter 10, and on the lower portions of the photomultiplier 15. In the case where the moisture-proof materials 8, 8 are applied in this manner, the problem that the adhesive 7 is deteriorated by being adversely affected by ambient humidity does not arise. As the moisture-proof materials 8, 8, an epoxy paint, a silicone material or the like may be used. Instead of coating the moisture-proof materials 8, 8, films, tapes or the like formed of a moisture-proof material may be adhered at least to the side faces of the adhesive 7. Also, since the filter 10 and the light guide member 11 are adhered to each other by use of an adhesive, the moisture-proof material may be coated also around the adherence surface therebetween. On the other hand, in the case of the box type photomultiplier having a flat light receiving face, the adhesive does not become thick locally when the filter is adhered to the light receiving face. However, also in this case, the adherence effects may be made more reliable by applying the moisture-proof material to the side faces of the adhesive.

Figure 9B:
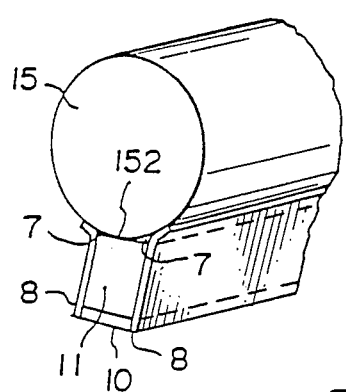
Figure 9C:
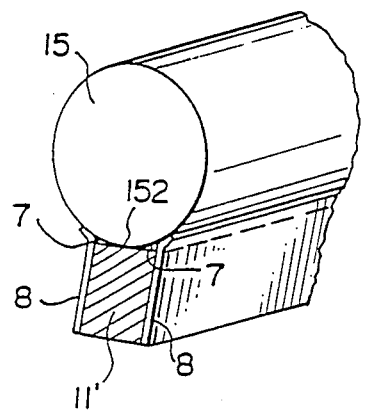
Figure 9D:
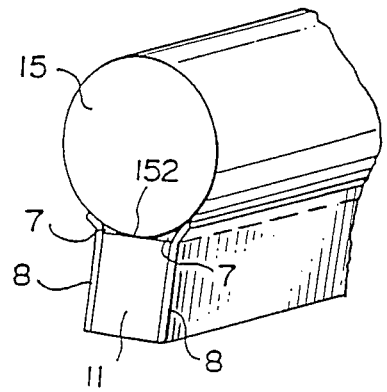
Figure 10:
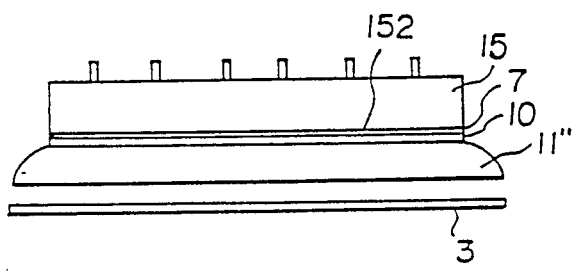

FIG. 9B shows the case where the light guide member 11 is adhered to the light receiving face 152 of the photomultiplier 15, and the aforesaid filter 10 is adhered to the light input face of the light guide member 11. Also in this case, the thickness of the adhesive 7 becomes large at both end portions, and the moisture-proof materials 8, 8 should preferably be applied as shown to prevent deterioration of the adhesive 7. Also, as shown in FIG. 9C, the light guide member 11' provided on the light receiving face 152 may be provided with filter effects by coloring so that only light having a wavelength within the wavelength range of the light emitted by the stimulable phosphor sheet is transmitted and light having a wavelength within the wavelength range of stimulating rays is absorbed. Further, in the case where the light detection means is disposed in a read-out apparatus for detecting light reflected by a scanning surface or the like other than the radiation image read-out apparatus using the stimulable phosphor sheet, the aforesaid filter is unnecessary, and the light guide member 11 alone may be adhered to the light receiving face 152 of the photomultiplier 15 as shown in FIG. 9D. Also, as mentioned with reference to FIG. 6, the light guide member 11" may be formed as shown in FIG. 10.

Still further examples of the photomultipliers will hereinbelow be described with reference to FIGS. 11A, 11B, 12A and 12B.

Figure 11A:
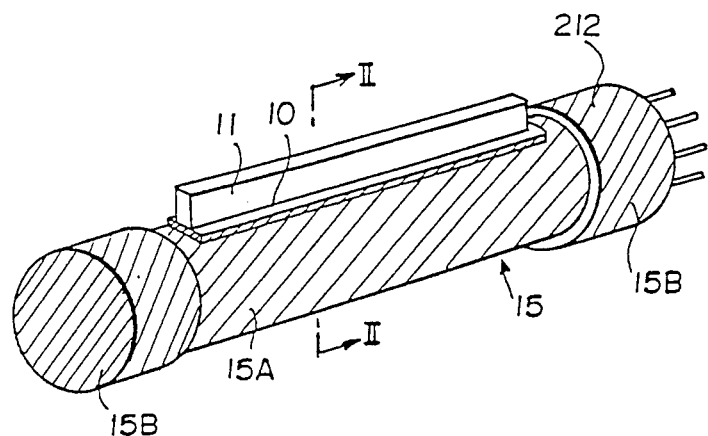
FIG. 11A is a perspective view showing another example of the photomultiplier provided with an optical element.
Figure 11B:
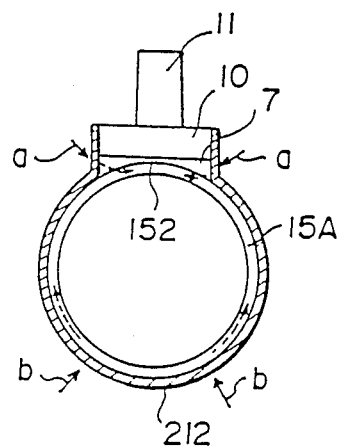
FIG. 11B is a sectional view taken along line II—II of FIG. 11A, FIGS. 12A and 12B are perspective views showing further examples of the photomultipliers provided with an optical element.

In FIG. 11A, the photomultiplier 15 is provided with caps 15B, 15B at both ends of a body 15A. In the course of the detection of the light emitted by the stimulable phosphor sheet by the light detection means constituted by the photomultiplier 15, the filter 10 and the light guide member 11, a part of stimulating rays reflected from the scanning position and entering the filter 10 via the light guide member 11 is cut off by the filter 10 and is not transmitted to the light receiving face 152. However, as indicated by the arrows a, a in FIG. 11B, there is the risk of the reflected stimulating rays entering from the light-permeable adhesive 7 without passing through the filter 10 and impinging upon the light receiving face 152. In the case of the long photomultiplier, the area from which the reflected stimulating rays can enter becomes large, and therefore the reflected stimulating rays scattered by being reflected by surrounding members after reflection from the stimulable phosphor sheet may readily enter the photomultiplier and adversely affect the accuracy of detection of the light emitted by the stimulable phosphor sheet. Also, when ambient light enter from the circumferential surface of the photomultiplier 15 as indicated by the arrows b, b in FIG. 11B, the body 15A of the photomultiplier 15 formed of glass or the like may transmit the entering light to the light receiving face 152. Accordingly, the overall surface of the light detection means outside of the light guide member 11 and outside of the upper surface of the filter 10 in FIG. 11A is coated with a black paint 212 acting in the same manner as a light-shielding material. As a result, the surface coated with the black paint 212 is shielded from light, and only light passing through the filter 10 impinges upon the light receiving face 152 while the reflected stimulating rays and the ambient light are not transmitted to the light receiving face 152. The side faces of the light guide member 11 are not coated with the black paint 212 so that the light guide member 11 contacts the ambient air and substantially guides the incident light through total reflection. As the black paint 212, an epoxy paint or the like should preferably be used for achieving good adhesion thereof to the photomultiplier body formed of glass. In the case where the black paint is used as the light-shielding material, the circumferential surface of the light detection means having protrusions and recesses can easily be covered by the light-shielding material at a high work efficiency.

In the case where little effect of the ambient light is expected and entry of the reflected stimulating rays is to be mainly prevented, at least the regions from the filter 10 to the side surfaces adjacent to the light receiving face 152 of the photomultiplier 15 may be shielded from light.

Figure 12A:
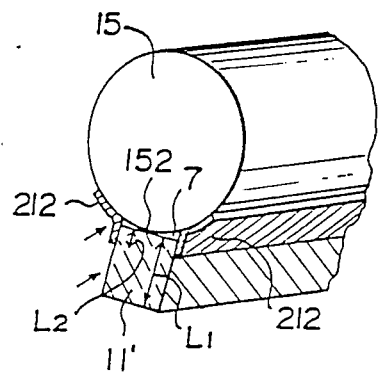
Figure 12B:
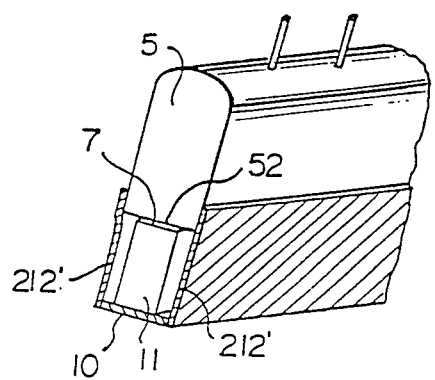

In FIG. 12A, the light guide member 11' is adhered to the light receiving face 152 by the adhesive 7 and is provided with filter effects by coloring so that only light having a wavelength within the wavelength range of the light emitted by the stimulable phosphor sheet is transmitted and light having a wavelength within the wavelength range of stimulating rays is absorbed. In this case, the overall length L1 of the light guide member 11′ is selected for achieving good light guide. Therefore, the portion of the light guide member 11′ corresponding to a length L2 sufficient for accomplishing the effects of the filter may be regarded as the filter portion, and the regions from the side faces of the filter portion to the side faces adjacent to the light receiving face 152 may be covered by the black paint 212. Reflected stimulating rays entering from the side faces of the light guide member 11 outside of the covered side faces are substantially attenuated by the filter effects of the light guide member 11′ and are not transmitted to the light receiving face 152. For example, in the case where the length L2 over which the black paint is applied is 3.5 mm, the amount of the reflected stimulating rays incident upon the light receiving face 152 can be decreased to approximately $1/10^9$ as compared with the case where no black paint is applied. Also, as shown in FIG. 12B, the light guide member 11 may be adhered to the light receiving face 52 of the box type photomultiplier 5, and the aforesaid filter 10 may be adhered to the light input face of the light guide member 11. In this case, the regions from the side faces of the filter 10 to the side faces adjacent to the light receiving face 52 should continuously be shielded from light. However, the side faces of the light guide member 11 must be in contact with ambient air, and therefore the width of the light guide member 11 is made smaller than the width of the filter 10. Also, light-shielding plates, light-shielding tapes or the like are used as the light-shielding materials 212′, 212′, and both ends of each of the light-shielding materials 212′, 212′ are secured respectively to the photomultiplier 5 and the filter 10.

Figure 13:
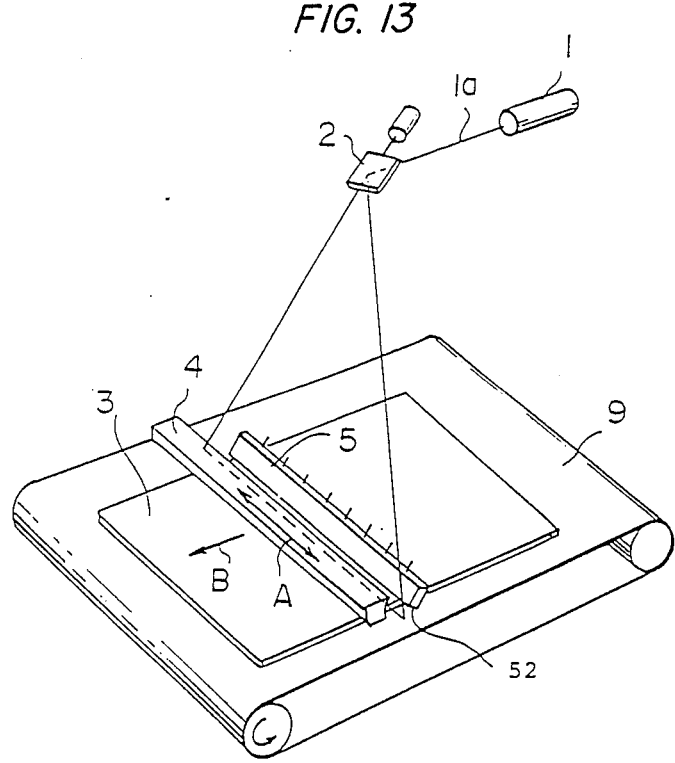
FIG. 13 is a perspective view showing a further embodiment of the image read-out apparatus in accordance with the present invention, which is fabricated for reading out a radiation image.
Figure 14:
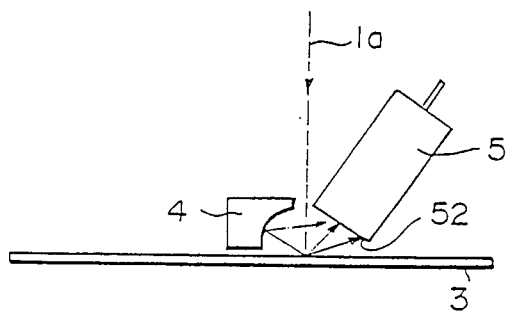
FIG. 14 is a schematic view showing the action of the mirror in the embodiment of FIG. 13.

FIG. 13 shows a further embodiment of the image read-out apparatus in accordance with the present invention, which is fabricated for reading out a radiation image, and FIG. 14 shows the action of a mirror used in this embodiment. In FIGS. 13 and 14, similar elements are numbered with the same reference numerals with respect to FIG. 1. In this embodiment, a mirror 4 is positioned along the main scanning line on the side opposite to the photomultiplier 5 with respect to the main scanning line. As shown in FIG. 14, the mirror 4 reflects light, which is emitted by the scanning portion of the stimulable phosphor sheet 3 in directions other than towards the light receiving face 52 of the photomultiplier 5, towards the light receiving face 52. Though the mirror 4 shown is formed in a block shape, it may have any shape insofar as it extends along the main scanning line and sufficiently reflects the light emitted by the stimulable phosphor sheet 3 towards the light receiving face 52. The mirror 4 may be replaced by an other optical reflection element such as a prism. In this embodiment, it becomes possible to further improve the efficiency with which the light emitted by the stimulable phosphor sheet 3 is guided. In this embodiment, too, the photomultiplier 15 as shown in FIGS. 4A and 4B may be used. Further, the photomultiplier may be modified as shown in FIGS. 5A through 5J, and FIGS. 6 and 7.

The mirror 4 will reflect not only the light emitted by the stimulable phosphor sheet 3 but also stimulating rays reflected by the sheet 3 towards the light receiving face 52. Therefore, in order to decrease the adverse effect of the reflected stimulating rays, a mirror such as a dichroic mirror for reflecting only light having a wavelength within the wavelength range of the light emitted by the stimulable phosphor sheet 3 and transmitting or absorbing light having a wavelength within the wavelength range of stimulating rays should be used as the mirror 4.

In a still further embodiment of the image read-out apparatus in accordance with the present invention, the light detection means comprises the aforesaid long photomultiplier, and an integrating cylinder provided with a slit extending in the main scanning direction for allowing passage of the stimulating rays therethrough, and an aperture opening above the section including the main scanning line on the stimulable phosphor sheet, said integrating cylinder being positioned so that the light receiving face of the photomultiplier is positioned at the inner surface of said integrating cylinder. In this embodiment, since light emitted by the scanning position on the stimulable phosphor sheet in directions other than towards the light receiving face of the photomultiplier is diffuse-reflected by the inner surface of the integrating cylinder and made to impinge upon the light receiving face of the photomultiplier, it is possible to improve the efficiency with which light emitted by the stimulable phosphor sheet is guided. The integrating cylinder is a cylindrical member having the same optical characteristics as an integrating sphere used as a part of a spherical luminous flux meter. It repeatedly diffuse-reflects light entering the cylinder by the inner surface of the cylinder and makes the light impinge upon the light receiving face of the photomultiplier. The term "positioning a light receiving face of a photomultiplier at an inner surface of an integrating cylinder" embraces not only the case where the photomultiplier is positioned so that its light receiving face is flush with the inner surface of the integrating cylinder, but also the case where the photomultiplier is mounted on the integrating cylinder via a filter and/or a light guide member and is positioned so that the light receiving face is in the vicinity of the inner surface of the integrating cylinder. Such an embodiment will be described with reference to FIGS. 15 through 20.

Figure 15:
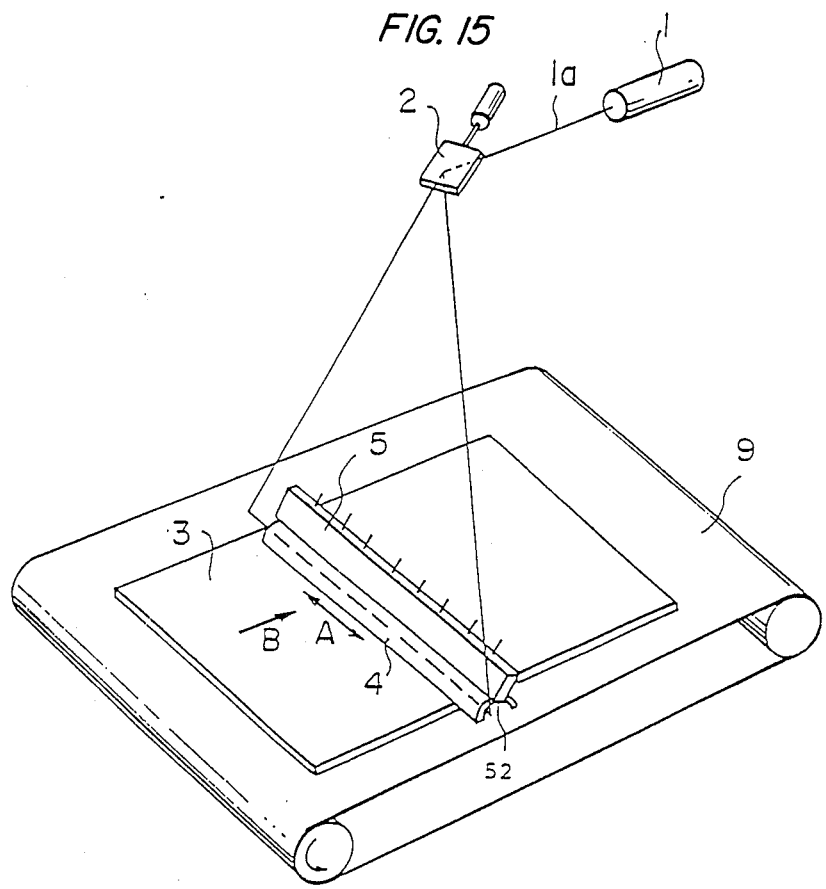
FIG. 15 is a perspective view showing a still further embodiment of the image read-out apparatus in accordance with the present invention, which is fabricated for reading out a radiation image.
Figure 16:
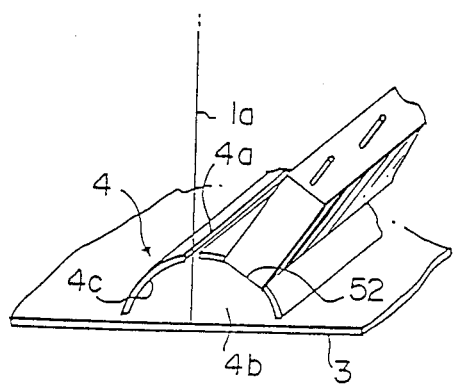
FIG. 16 is a side view showing the section in the vicinity of the integrating cylinder in the embodiment of FIG. 15, FIGS. 17 and 18 are side views showing the section in the vicinity of the integrating cylinder in further embodiments of the image read-out apparatus in accordance with the present invention.

Referring to FIG. 15, stimulating rays 1a emitted by the stimulating ray source 1 and deflected by the galvanometer mirror 2 impinge upon the stimulable phosphor sheet 3 via a slit of an integrating cylinder 4. The light receiving face 52 of the photomultiplier 5 is positioned at the inner surface of the integrating cylinder 4, and the integrating cylinder 4 is positioned integrally with the photomultiplier 5 in the main scanning direction. The integrating cylinder 4 will be described in detail with reference to FIG. 16.

Figure 17:
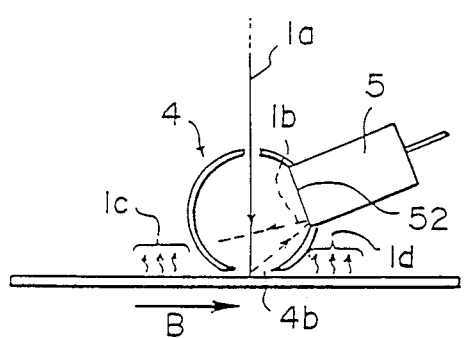

By way of example, the integrating cylinder 4 is formed in a semi-cylindrical shape and provided, at its upper end section, with a slit 4a extending in the main scanning direction and allowing passage of the stimulating rays 1a therethrough. The lower end section of the integrating cylinder 4 is opened above the section including the main scanning line to form an aperture 4b. The integrating cylinder 4 has an inner surface 4c coated with a white paint or the like exhibiting a high diffuse reflectivity. The light emitted by the scanning position on the stimulable phosphor sheet 3 in directions other than towards the light receiving face 52 is repeatedly diffuse-reflected by the inner surface 4c of the integrating cylinder 4 and made to impinge upon the light receiving face 52. Therefore, it is possible to markedly improve the efficiency with which the light emitted by the stimulable phosphor sheet 3 is guided. In order to make the light emitted by the stimulable phosphor sheet 3 impinge efficiently upon the light receiving face 52 by the integrating cylinder 4, the width of the slit 4a should preferably be as small as possible, and the integrating cylinder 4 should preferably be positioned as close to the sheet 3 as possible. As shown in FIG. 17, the aperture 4b of the integrating cylinder 4 may also be formed in a slit-like shape, and the integrating cylinder 4 may be formed generally in an approximately full-cylindrical shape. In this case, it becomes possible to read the image more accurately. Specifically, a part of the stimulating rays 1a impinging upon the stimulable phosphor sheet 3 may be reflected by the sheet 3, a part of the reflected stimulating rays 1b is further reflected by the light receiving face 52 or the like as indicated by the broken line in FIG. 17 and made to impinge upon portions of the sheet 3 where image read-out has not been finished, thereby stimulating said portions and causing them to emit light. In the case where the approximately full-cylindrical integrating cylinder 4 is provided, the aforesaid reflected stimulating rays 1b are interrupted by the wall surface of the integrating cylinder 4 and prevented from impinging upon said sheet portions where image read-out has not been finished. Therefore, it is possible to eliminate the problem that said sheet portions are stimulated by the reflected stimulating rays 1b. On the other hand, when the stimulable phosphor sheet 3 is exposed to a radiation for recording the radiation image thereon prior to the aforesaid image read-out, instantaneous light emission arises over the whole surface of the sheet 3. It is known that the instantaneous light emission continues while decaying even after irradiation to the sheet 3 is ceased. Therefore, in the case where the time interval between the exposure of the stimulable phosphor sheet 3 and the image read-out from the sheet 3 is short, an instantaneous light emission after-glow 1c arises at sheet portions which have not been exposed to the stimulating rays 1a as shown in FIG. 6. When the instantaneous light emission after-glow 1c is detected by the photomultiplier 5, it becomes impossible to accurately detect the light emitted by the sheet 3 in proportion to the stored radiation energy, and the obtained reproduced image becomes inaccurate. Further, the stimulated light emission generated by exposure to the stimulating rays 1a continues as an after-glow even after scanning with the stimulating rays 1a is finished, and a stimulated light emission after-glow 1d arises at sheet portions where image read-out has been finished. The intensity level of the stimulated light emission after-glow 1d differs according to the type of the stimulable phosphor constituting the stimulable phosphor sheet 3. When the intensity level of the stimulated light emission after-glow 1d is comparatively high and the after-glow 1d is detected by the photomultiplier 5, the image read-out accuracy is adversely affected. However, when the aperture 4b of the integrating cylinder 4 is formed in a slit-like shape and positioned on the main scanning line as shown in FIG. 17, the instantaneous light emission after-glow 1c and the stimulated light emission after-glow 1d are interrupted by the wall surface of the integrating cylinder 4 and prevented from impinging upon the photomultiplier 5. Accordingly, it is possible to read out the image accurately.

Figure 18:
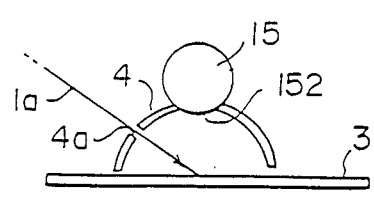

Also, as shown in FIG. 18, a photomultiplier 15 may be positioned at the upper end section of the integrating cylinder 4, and the stimulating rays 1a may be made to impinge obliquely upon the stimulable phosphor sheet 3 via the slit 4a.

In the embodiment of FIG. 15, since the integrating cylinder is provided integrally with the photomultiplier for making a part of the light emitted by the stimulable phosphor sheet impinge upon the light receiving face of the photomultiplier, it becomes possible to further improve the light guiding efficiency.

Figure 20:
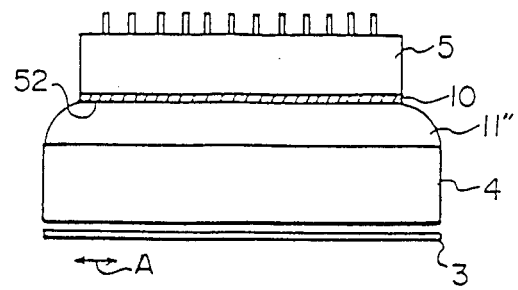
FIGS. 19A to 19F and 20 are schematic views showing the photomultipliers provided with a filter and a thin light guide member on the light receiving face.
Figure 19A:
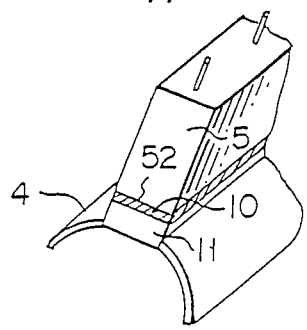
Figure 19B:
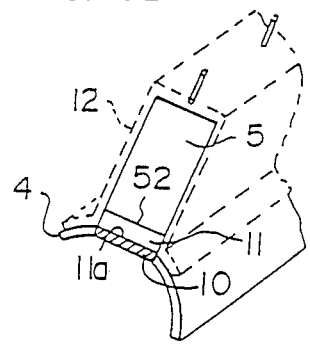
Figure 19C:
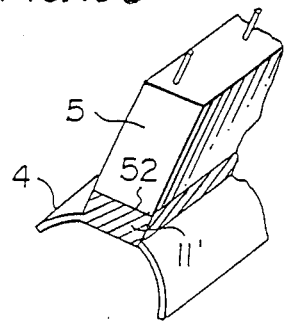
Figure 19D:
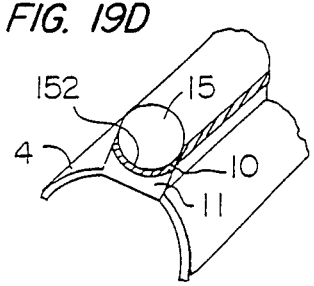
Figure 19E:
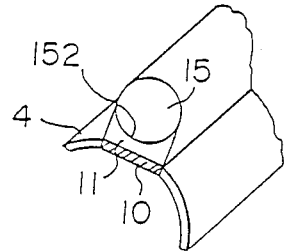
Figure 19F:
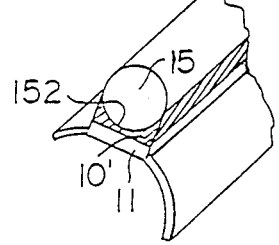

In the embodiment of FIG. 15, the photomultiplier may be provided with the thin light guide member and/or the filter as shown in FIGS. 19A through 19F which respectively correspond to the modifications as shown in FIGS. 5A through 5F in the embodiment of FIG. 1. Further, as described with reference to FIG. 6, the light guide member 11" may be formed as shown in FIG. 20. Also, since the integrating cylinder 4 reflects both the light emitted by the stimulable phosphor sheet 3 and the reflected stimulating rays 1b, the inner surface of the integrating cylinder 4 should preferably be colored so that it reflects light having a wavelength within the wavelength range of the light emitted by the stimulable phosphor sheet 3 and absorbs light having a wavelength within the wavelength range of the stimulating rays. In this case, it is possible to further decrease the adverse effect of the reflected stimulating rays 1b. Further, as described with reference to FIG. 7, the photomultiplier 5 may be covered with the light shielding case 12 as shown in FIG. 19B.

Further, the present invention can be embodied as shown in FIGS. 5G through 5J, wherein the corresponding elements are indicated with the same reference numerals.

In another embodiment of the image read-out apparatus in accordance with the present invention, the light detection means comprises a long photomultiplier having a light receiving face extending in parallel with the stimulable phosphor sheet above and along the main scanning line and positioned close to the sheet, and an optical reflection element for reflecting the stimulating rays, which enters between the photomultiplier and the sheet and impinges upon the optical reflection element, under the light receiving face of the photomultiplier and making the stimulating rays impinge upon the stimulable phosphor sheet approximately normal to the sheet. The light detection means should preferably further comprise an integrating cylinder provided with a slit extending in the main scanning direction for allowing passage of the stimulating rays therethrough, and an aperture opening above the section including the main scanning line on the sheet, said integrating cylinder being positioned so that the light receiving face of the photomultiplier is positioned at the inner surface of said integrating cylinder. In this embodiment, since the light receiving face of the photomultiplier is positioned above the main scanning line and the optical reflection element is provided for making the stimulating rays impinge upon the stimulable phosphor sheet approximately normal to the sheet, it is possible to make the apparatus small and to efficiently guide the light carrying the image and obtained from the sheet. This embodiment will be described below with reference to FIGS. 21 to 23 and FIGS. 24A through 24F.

Figure 21:
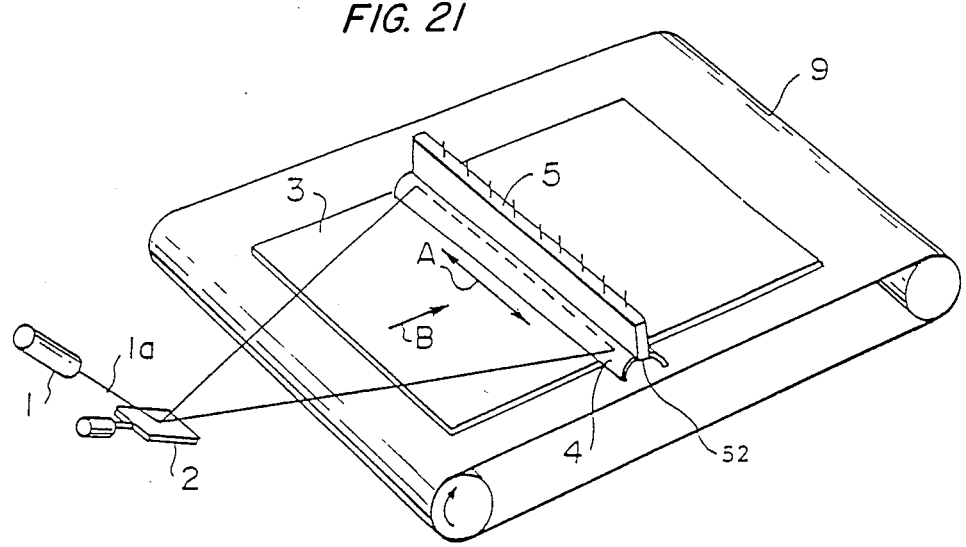
FIG. 21 is a perspective view showing another embodiment of the image read-out apparatus in accordance with the present invention, which is fabricated for reading out a radiation image.
Figure 22:
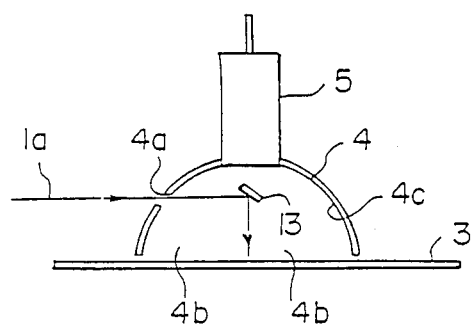
FIG. 22 is a side view showing the section in the vicinity of the integrating cylinder in the embodiment of FIG. 21.

Referring to FIGS. 21 and 22, the stimulating rays 1a emitted by the stimulating ray source 1 and deflected by the galvanometer mirror 2 impinge upon a mirror 13 via a slit 4a of the integrating cylinder 4. The stimulating rays 1a are reflected by the mirror 13 and made to impinge upon the stimulable phosphor sheet 3 approximately normal thereto. The mirror 13 is a dichroic mirror for reflecting light having a wavelength within the wavelength range of the stimulating rays 1a and transmitting light having a wavelength within the wavelength range of the light emitted by the stimulable phosphor sheet 3. The mirror 13 may be replaced by another optical reflection element such as a prism. The light receiving face 52 of the photomultiplier 5 is positioned in parallel with the stimulable phosphor sheet 3 above and along the main scanning line. Since the stimulating rays 1a are made by the mirror 13 to impinge upon the stimulable phosphor sheet 3 approximately normal thereto and the light receiving face 52 of the photomultiplier 5 is positioned above the main scanning line, light emitted non-directionally by the scanning position on the sheet 3 is efficiently made to impinge upon the light receiving face 52. Also, since the mirror 13 is the dichroic mirror as mentioned above, the light emitted by the stimulable phosphor sheet 3 is not interrupted by the mirror 13, and therefore, the light guiding efficiency is not adversely affected by the mirror 13.

Figure 23:
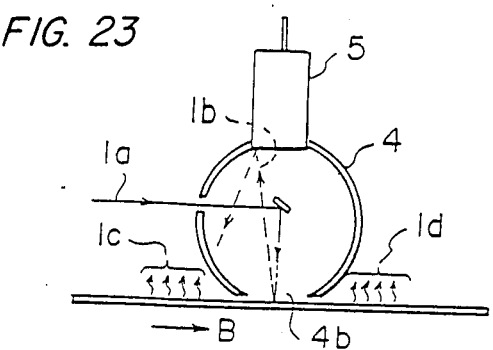
FIG. 23 is a side view showing the section in the vicinity of the integrating cylinder in a further embodiment of the image read-out apparatus in accordance with the present invention.
Figure 24A:
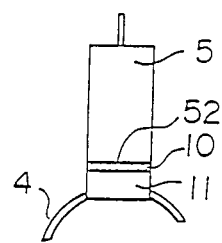
FIGS. 24A to 24F are schematic views showing the photomultipliers provided with a filter and a thin light guide member on the light receiving face.
Figure 24B:
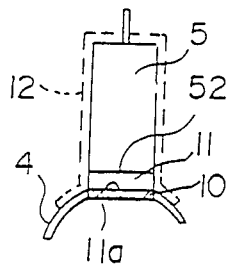
Figure 24C:
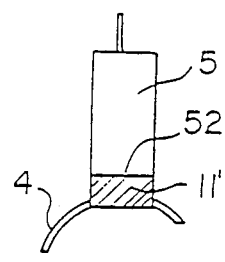
Figure 24D:
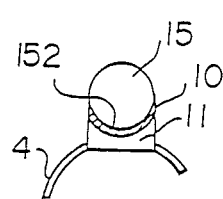
Figure 24E:
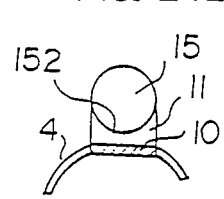
Figure 24F:
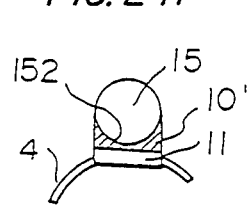
Figure 25:
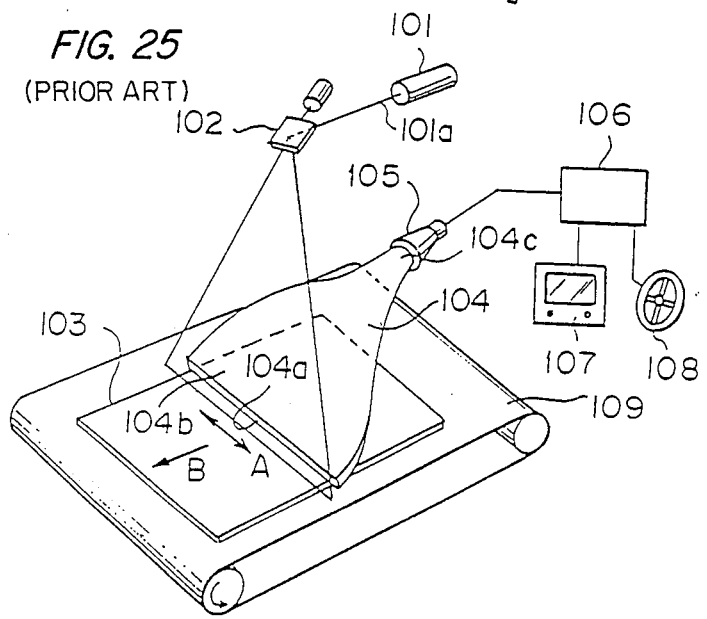
FIG. 25 is a perspective view showing the conventional radiation image read-out apparatus.

In the embodiment of FIG. 21, the integrating cylinder 4 of the type as described with reference to FIG. 15 is positioned integrally with the photomultiplier 5 in the main scanning direction so that the light receiving face 52 of the photomultiplier 5 is positioned at the inner surface of the integrating cylinder 4. As shown in FIG. 22, the integrating cylinder 4 is provided with the slit 4a at the position shown, and the mirror 13 is positioned inside of the integrating cylinder 4. Further, as shown in FIG. 23, the integrating cylinder 4 may be formed in an approximately full-cylindrical shape wherein the aperture 4b is formed in a slit-like shape. In this case, it becomes possible to obtain the effects as described above with reference to FIG. 17.

In the embodiment of FIG. 21, since the light receiving face 52 is positioned in parallel with the sheet 3 above the main scanning line and the stimulating rays 1a are made to impinge upon the sheet 3 approximately normal thereto, it is possible to efficiently guide the light emitted three-dimensionally by the scanning position on the sheet 3. Further, since the mirror 13 is positioned inside of the integrating cylinder 4, it is possible to deflect the stimulating rays 1a horizontally with respect to the sheet 3, and therefore to make the whole apparatus small in height.

In the embodiment of FIG. 21, the photomultiplier may be provided with the thin light guide member and/or the filter as shown in FIGS. 24A through 24F which respectively correspond to the modifications as shown in FIGS. 19A through 19F for the embodiment of FIG. 15. Further, the light guide member 11" may be formed as shown in FIG. 20.

Though the present invention is illustrated by taking the radiation image read-out apparatus as an example, it should be understood that the present invention is applicable to any image read-out apparatus for making the apparatus small and improving the light guiding efficiency.

We claim:

1. An image read-out apparatus including a main scanning means for scanning a sheet carrying an image recorded thereon with a light beam in a main scanning direction and obtaining light carrying the image information from the sheet, a sub-scanning means for moving the sheet with respect to the light beam in a sub-scanning direction approximately normal to the main scanning direction, and a light detection means for detecting the light obtained from the sheet,
wherein said light detection means comprises a photomultiplier elongated along said main scanning direction having a light receiving face extending along the main scanning line and positioned substantially adjacent to said sheet;
and wherein said light receiving face of said photomultiplier substantially covers the entire length of the main scanning line.

2. An apparatus as defined in claim 1 wherein said photomultiplier is a box type photomultiplier.

3. An apparatus as defined in claim 1 wherein said photomultiplier is a Venetian blind type photomultiplier.

4. An apparatus as defined in claim 1 wherein said photomultiplier is covered by a light shielding case.

5. An apparatus as defined in claim 1 wherein said sheet is a stimulable phosphor sheet carrying a radiation image stored thereon, said light beam is stimulating rays for causing said stimulable phosphor sheet to emit light in proportion to the stored radiation energy, and said light detection means detects the light emitted by said stimulable phosphor sheet.

6. An apparatus as defined in claim 5 wherein said light detection means is provided with a filter for selectively transmitting light having a wavelength within the wavelength range of the light emitted by said stimulable phosphor sheet and/or a light guide member for guiding the light, which is emitted by said stimulable phosphor sheet and enters from a light input face of said light guide member positioned to face said stimulable phosphor sheet, to said light receiving face of said photomultiplier, said filter and/or said light guide member being positioned on said light receiving face.

7. An apparatus as defined in claim 5 wherein said light guide member is a light guide liquid 8. An apparatus as defined in claim 7 wherein said light guide liquid is an oily liquid.

9. An apparatus as defined in claim 8 wherein said oily liquid is selected from the group consisting of silicone oil and liquid paraffin.

10. An apparatus as defined in claim 1 wherein said light detection means further comprises an optical element adhered to said light receiving face of said photomultiplier by a light-permeable adhesive, and side faces of said adhesive are covered by a moisture-proof material.

11. An apparatus as defined in claim 10 wherein said sheet is a stimulable phosphor sheet carrying a radiation image stored thereon, said light beam is stimulating rays for causing said stimulable phosphor sheet to emit light in proportion to the stored radiation energy, and said light detection means detects the light emitted by said stimulable phosphor sheet.

12. An apparatus as defined in claim 11 wherein said optical element is a filter for selectively transmitting the light emitted by said stimulable phosphor sheet.

13. An apparatus as defined in claim 5 wherein said light detection means further comprises a filter for selectively transmitting the light emitted by said stimulable phosphor sheet, said filter is formed integrally with said photomultiplier and disposed between said light receiving face and said scanning line, and regions from side faces of said filter to side faces of said photomultiplier adjacent to said light receiving face are covered by a light-shielding material.

14. An apparatus as defined in claim 13 wherein said light-shielding material is a black paint.

15. An apparatus as defined in claim 1 wherein said light detection means further comprises an optical reflection element extending along said main scanning line in the vicinity thereof for reflecting the light obtained from said sheet towards said light receiving face of said photomultiplier.

16. An apparatus as defined in claim 15 wherein said sheet is a stimulable phosphor sheet carrying a radiation image stored thereon, said light beam is stimulating rays for causing said stimulable phosphor sheet to emit light in proportion to the stored radiation energy, and said light detection means detects the light emitted by said stimulable phosphor sheet.

17. An apparatus as defined in claim 16 wherein said light detection means is provided with a filter for selectively transmitting light having a wavelength within the wavelength range of the light emitted by said stimulable phosphor sheet and/or a light guide member for guiding the light, which is emitted by said stimulable phosphor sheet and enters from a light input face of said light guide member positioned to face said stimulable phosphor sheet, to said light receiving face of said photomultiplier, said filter and/or said light guide member being positioned on said light receiving face.

18. An apparatus as defined in claim 1 wherein said light detection means further comprises an integrating cylinder provided with a slit extending in said main scanning direction for allowing passage of said light beam therethrough, and an aperture opening above the section including said main scanning line on said sheet, said integrating cylinder being positioned so that said light receiving face of said photomultiplier is positioned at the inner surface of said integrating cylinder.

19. An apparatus as defined in claim 18 wherein said sheet is a stimulable phosphor sheet carrying a radiation image stored thereon, said light beam is stimulating rays for causing said stimulable phosphor sheet to emit light in proportion to the stored radiation energy, and said light detection means detects the light emitted by said stimulable phosphor sheet.

20. An apparatus as defined in claim 19 wherein said light detection means is provided with a filter for selectively transmitting light having a wavelength within the wavelength range of the light emitted by said stimulable phosphor sheet and/or a light guide member for guiding the light, which is emitted by said stimulable phosphor sheet and enters from a light input face of said light guide member positioned to face said stimulable phosphor sheet, to said light receiving face of said photomultiplier, said filter and/or said light guide member being positioned on said light receiving face.

21. An apparatus as defined in claim 1 wherein said light receiving face of said photomultiplier extends in parallel with said sheet above and along said main scanning line, and said light detection means further comprises an optical reflection element for reflecting said light beam, which enters between said photomultiplier and said sheet and impinges upon said optical reflection element, under said light receiving face of said photomultiplier and making said light beam impinge upon said sheet approximately normal thereto.

22. An apparatus as defined in claim 21 wherein said light detection means further comprises an integrating cylinder provided with a slit extending in said main scanning direction for allowing passage of said light beam therethrough, and an aperture opening above the section including said main scanning line on said sheet, said integrating cylinder being positioned so that said light receiving face of said photomultiplier is positioned at the inner surface of said integrating cylinder.

23. An apparatus as defined in claim 21 wherein said sheet is a stimulable phosphor sheet carrying a radiation image stored thereon, said light beam is stimulating rays for causing said stimulable phosphor sheet to emit light in proportion to the stored radiation energy, and said light detection means detects the light emitted by said stimulable phosphor sheet.

24. An apparatus as defined in claim 22 wherein said sheet is a stimulable phosphor sheet carrying a radiation image stored thereon, said light beam is stimulating rays for causing said stimulable phosphor sheet to emit light in proportion to the stored radiation energy, and said light detection means detects the light emitted by said stimulable phosphor sheet.

25. An apparatus as defined in claim 23 wherein said light detection means is provided with a filter for selectively transmitting light having a wavelength within the wavelength range of the light emitted by said stimulable phosphor sheet and/or a light guide member for guiding the light, which is emitted by said stimulable phosphor sheet and enters from a light input face of said light guide member positioned to face said stimulable phosphor sheet, to said light receiving face of said photomultiplier, said filter and/or said light guide member being positioned on said light receiving face.

26. An apparatus as defined in claim 23 wherein said optical reflection element is a dichroic mirror for reflecting light having a wavelength within the wavelength range of said stimulating rays and transmitting light having a wavelength within the wavelength range of the light emitted by said stimulable phosphor sheet.

27. An apparatus as defined in claim 25 wherein said optical reflection element is a dichroic mirror for reflecting light having a wavelength within the wavelength range of said stimulating rays and transmitting light having a wavelength within the wavelength range of the light emitted by said stimulable phosphor sheet.

28. A light detecting device for detecting light carrying image information and obtained from a scanning surface carrying the image information recorded thereon when said scanning surface is scanned by a light beam,
wherein the improvement comprises the provision of:
(i) a long photomultiplier having a light receiving face extending along a scanning line of said light beam and positioned close to said scanning surface,
(ii) an optical element adhered to said light receiving face of said photomultiplier by a light-permeable adhesive, and
(iii) a moisture-proof material for covering side faces of said adhesive.

29. A light detecting device as defined in claim 28 wherein said scanning surface is a stimulable phosphor sheet carrying a radiation image stored thereon, and said light beam is stimulating rays for causing said stimulable phosphor sheet to emit light in proportion to the stored radiation energy.

30. A light detecting device as defined in claim 29 wherein said optical element is a filter for selectively transmitting the light emitted by said stimulable phosphor sheet.

31. A light detecting device for detecting light emitted by a stimulable phosphor sheet carrying a radiation image stored thereon in proportion to the stored radiation energy when said stimulable phosphor sheet is scanned by stimulating rays,
wherein the improvement comprises the provision of:
(i) a long photomultiplier having a light receiving face extending along a scanning line of said stimulating rays and positioned close to said stimulable phosphor sheet with said light receiving face facing said stimulable phosphor sheet, (ii) a filter for selectively transmitting the light emitted by said stimulable phosphor sheet, said filter being formed integrally with said photomultiplier and disposed between said light receiving face and said scanning line, and (iii) a light-shielding material for covering regions from side faces of said filter to side faces of said photomultiplier adjacent to said light receiving face.

32. A light detecting device as defined in claim 31 wherein said light-shielding material is a black paint.

* * * * *